(12) United States Patent
Tosh, IV

(10) Patent No.: US 10,844,715 B2
(45) Date of Patent: Nov. 24, 2020

(54) LOADING ARM ASSEMBLY AND METHOD OF USE

(71) Applicant: Repair King, Inc., Shinnston, WV (US)

(72) Inventor: Charlie L. Tosh, IV, Bluefield, VA (US)

(73) Assignee: Repair King, Inc., Shinnston, WV (US)

( * ) Notice: Subject to any disclaimer, the term of this patent is extended or adjusted under 35 U.S.C. 154(b) by 0 days.

(21) Appl. No.: 16/448,432

(22) Filed: Jun. 21, 2019

(65) Prior Publication Data

US 2019/0390549 A1     Dec. 26, 2019

Related U.S. Application Data

(60) Provisional application No. 62/687,842, filed on Jun. 21, 2018.

(51) Int. Cl.
*E21D 9/12* (2006.01)
*E21F 13/06* (2006.01)

(52) U.S. Cl.
CPC ............ *E21D 9/128* (2013.01); *E21F 13/063* (2013.01); *B65G 2814/0343* (2013.01)

(58) Field of Classification Search
CPC .......... E21F 13/063; E21D 9/12; E21D 9/128; B65G 2814/0343
USPC ....................................................... 198/515
See application file for complete search history.

(56) References Cited

U.S. PATENT DOCUMENTS

| | | | | |
|---|---|---|---|---|
| 1,752,714 A | * | 4/1930 | Wilcox | E21D 9/128 198/515 |
| 2,696,288 A | * | 12/1954 | Ball | E21D 9/128 198/515 |
| 4,159,055 A | * | 6/1979 | Eberle | E21D 9/128 198/512 |
| 4,165,803 A | * | 8/1979 | Keen | E21D 9/128 198/515 |
| 5,228,552 A | * | 7/1993 | Brandl | B65G 65/16 198/515 |
| 8,506,017 B2 | * | 8/2013 | Southern | E21D 9/1026 198/512 |
| 2019/0390549 A1 | * | 12/2019 | Tosh, IV | E21F 13/063 |

* cited by examiner

*Primary Examiner* — Mark A Deuble
(74) *Attorney, Agent, or Firm* — Clark & Brody LP

(57) ABSTRACT

A loading arm assembly for directing material removed by a mining machining having a cutting head and a conveyor assembly includes a loading arm assembly that includes a loading arm and a spacer connector. The loading arm is configured to be removably attachable to the spacer connector and the spacer connector is configured to be removably attachable to a gear box or other driving mechanism of the mining machine. A centering cap assembly can also be used to assist in centering the loading arm-spacer connector combination, the centering cap assembly being removably attachable to the gear box.

10 Claims, 12 Drawing Sheets

LOADING ARM ASSEMBLY AND METHOD OF USE

This application claims priority under 35 USC 119(e) based on application No. 62/687,842 filed on Jun. 21, 2018, and which is incorporated in its entirety in this application.

FIELD OF THE INVENTION

The present invention relates to a material loading assembly used in mining equipment, and particularly a loading arm assembly that has a specially configured spacer connector to improve the manner in which the loading arm assembly is attached to the equipment using the loading arms.

BACKGROUND ART

In the mining industry, mining equipment, particularly coal mining equipment, includes a cutting head, a conveyor, and coal loading arms for directing the coal removed by the cutting head to the conveyor. FIG. 1 shows one type of mining equipment 10 that employs a cutting head 1 and a conveyor assembly 3. These continuous mining machines are well known in the prior art and a more detailed description of all of the features thereof is not deemed necessary for understanding of the invention.

FIG. 2 shows a view of a part of the machine 10 of FIG. 1 that is relevant to the invention. In FIG. 2, a pan 5 is positioned beneath the cutting head 1 and a pair of coal loading arms 7 (hereinafter loading arm assembly). The loading arm assemblies are arranged horizontally and rotate to direct coal to the conveyor area 9 in the center of the pan 5. The actual conveyor and conveyor chain are not illustrated in FIG. 2 but their use in a mining machine is well known and an illustration is not needed for understanding of the invention.

Typically, the loading arms are mounted on a gear box that rotates the loading arms to direct the mined coal to the conveyor. A spacer (not shown) is used to separate the loading arms from the pan in the interest of clearing the conveyor chain. The loading arms attach to the gear box with long bolts passing through the spacer in a passive manner. There is no attachment other than the spacer being located by keys and encapsulated between the loading arms and the gear box under pressure of the long bolts.

Over time, these bolts will stretch due to the operation of the loading arms and the loading arms can become separated from the gear box and cause severe damage to the mining equipment.

To lessen the possibility of failure due to the bolts stretching, the spacer is removed and the loading arms are bolted directly to the gearbox allowing the use of shorter bolts. A new problem is created when the spacer is removed. In this configuration, the loading arms are positioned much closer to the conveyor. As the conveyor chain wears and slack is generated in the same, the conveyor chain can come into contact with the ends of the loading arms. This damages both components and creates possible source of an explosion hazard. The contact between the conveyor chain and the loading arms can create sparks in an area that is prone to methane concentration, if any is present, in the course of that particular mine's operations.

As such, there is a need to provide an improved loading arm designed to avoid these complications during mining equipment operation.

SUMMARY OF THE INVENTION

The invention is an improved loading arm assembly for a coal mining machine. The improved loading arm assembly includes a loading arm and a spacer connector that replaces the conventional loading arms and spacers of the prior art.

The loading arm is configured to removably attach to the spacer connector and the spacer connector, in turn is configured to removably attach to the driving mechanism of a mining machine.

The invention also includes a method of removing coal from a mining site using the inventive loading arm assembly on a mining machine. The mining machine can be one that uses a cutting head or one that does not.

The loading arm is also unique in comparison to the prior art loading arms as it contains one or more features like the ability to attach to spacer connector without the need for the long bolts used in prior art attachments and additional and peripheral key way slots that improve the positioning of the loading arm in the assembly.

The spacer connector is also unique in comparison to the prior art spacers in its dual ability to removably attach to both a loading arm and the driving mechanism, e.g., a gear box, again without the long bolts that are typically found in the prior art loading arm assemblies.

DETAILED DESCRIPTION OF THE INVENTION

The invention provides an improved loading arm assembly that is more securely attached to the gear box of the mining equipment and has less tendency to separate therefrom and damage the mining equipment using the loading arms.

Figure 1:
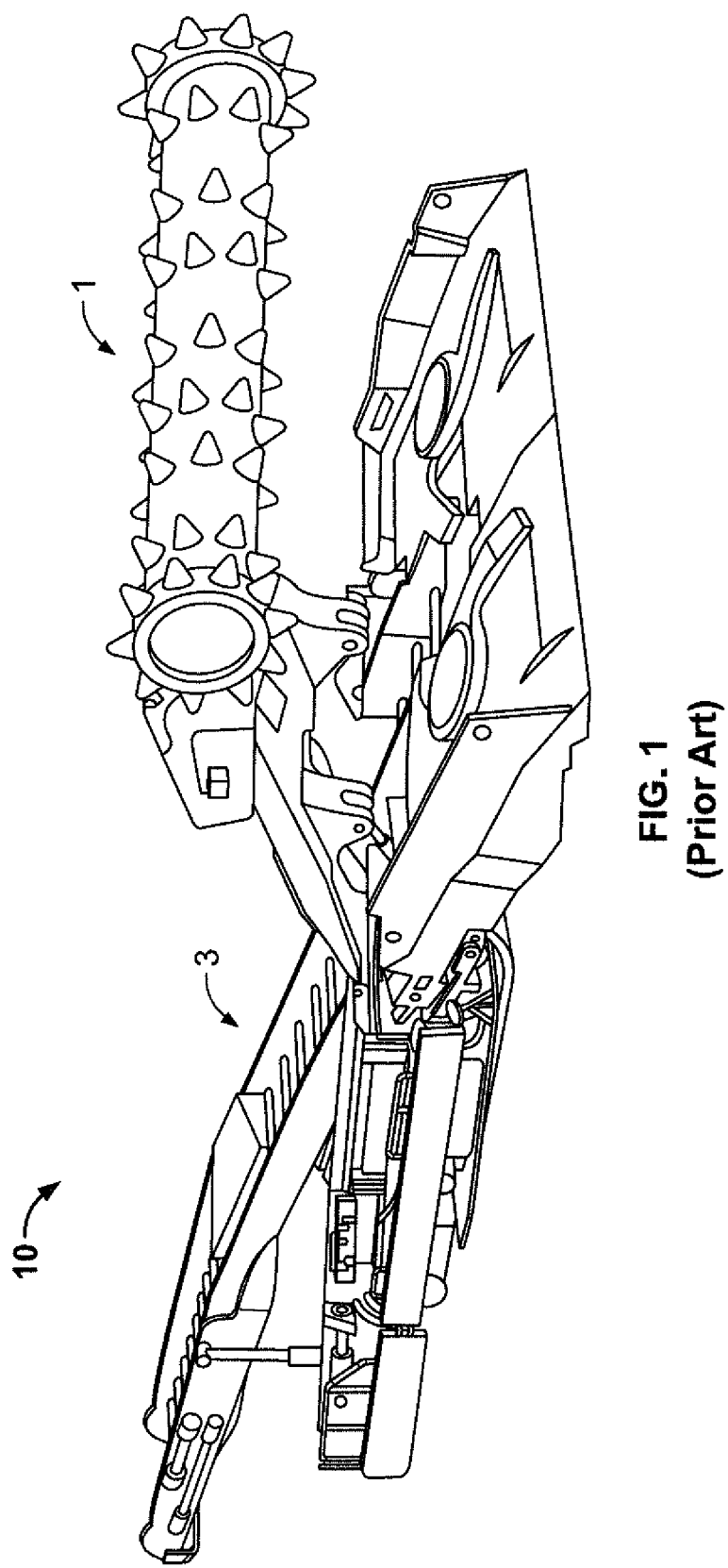
FIG. 1 is a perspective view of a typical mining machine that uses loading arms.
Figure 2:
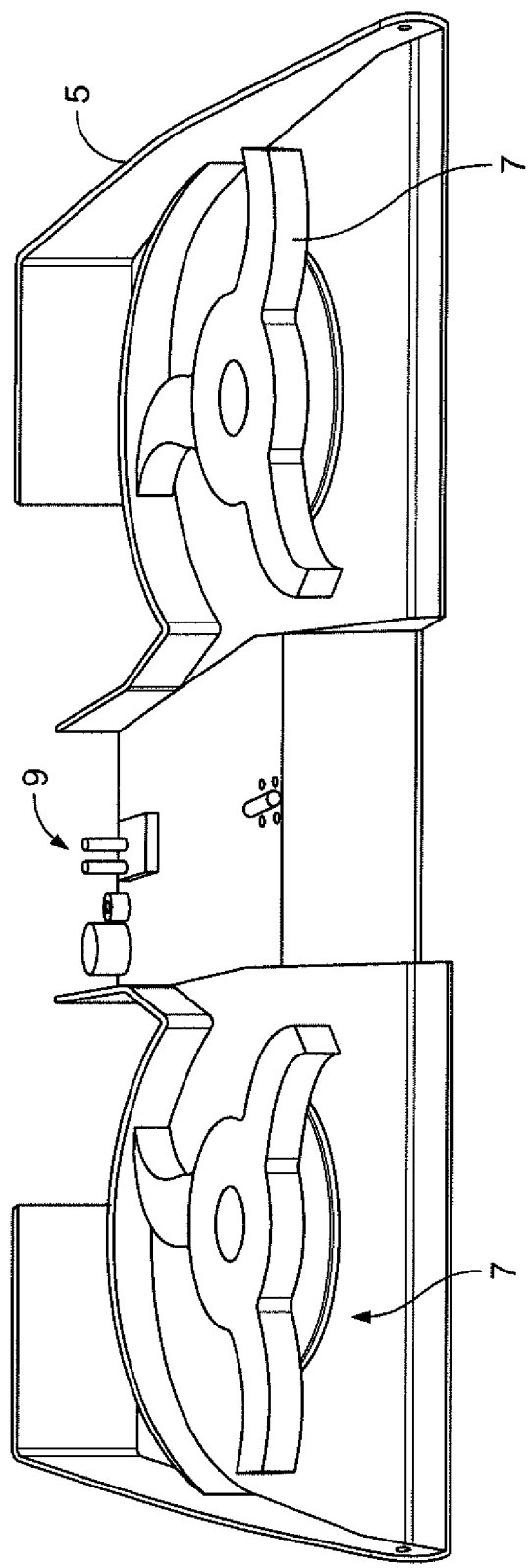
FIG. 2 shows detail of the mining machine of FIG. 1 in terms of the pan, the loading arms, and a conveyor area thereof.
Figure 3:
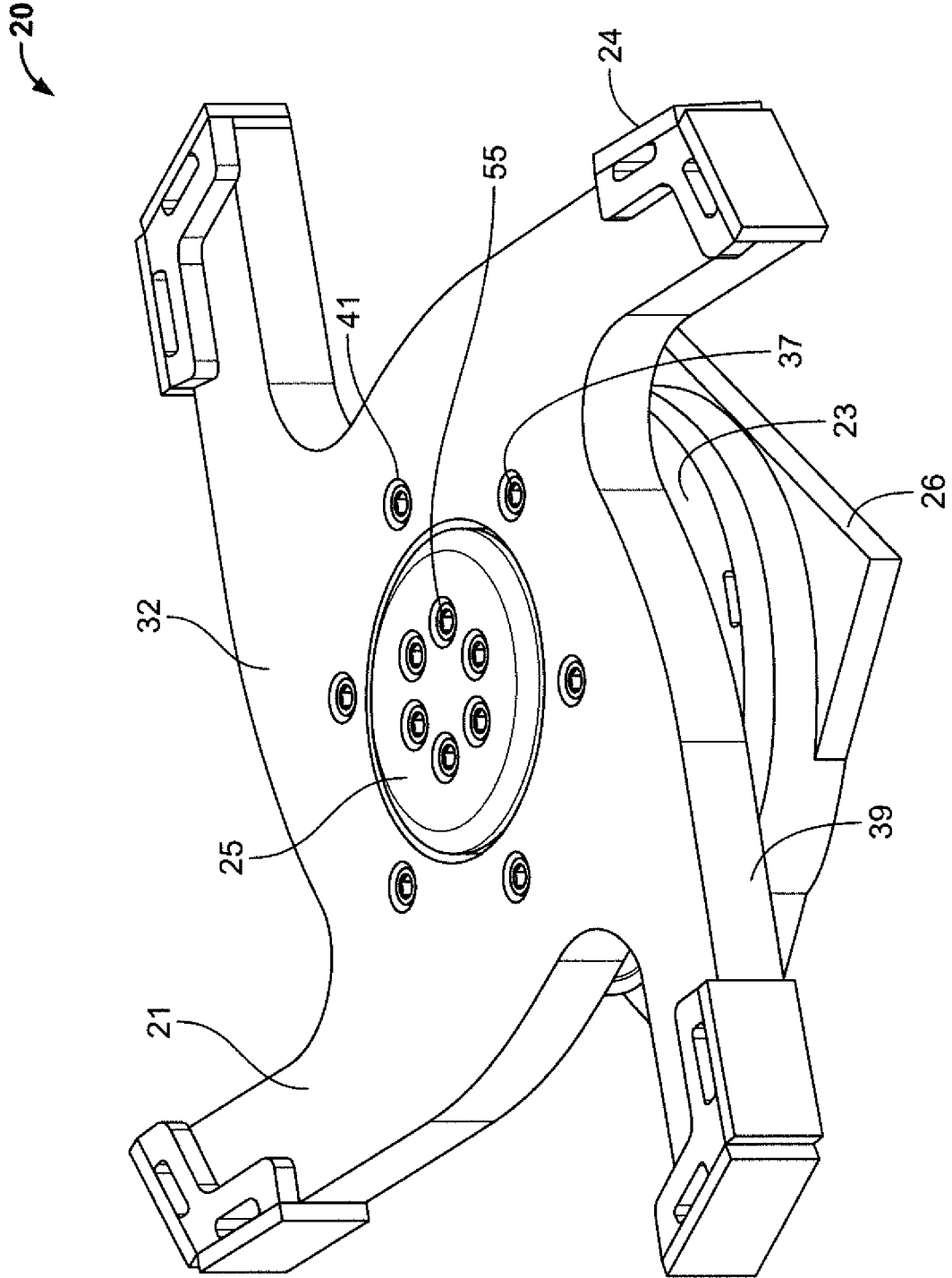
FIG. 3 is a perspective view of one embodiment of the loading arm assembly.
Figure 7:
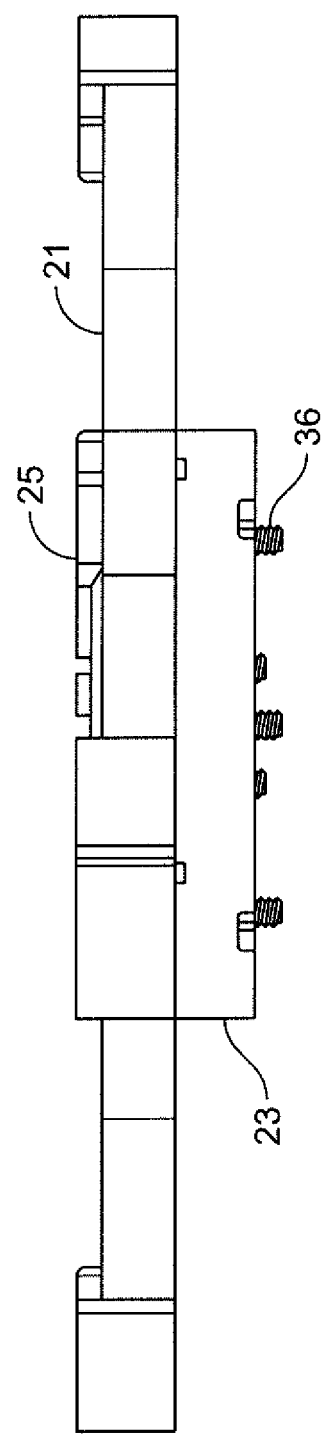
FIG. 7 shows a side view of the assembly of FIG. 3.
Figure 9:
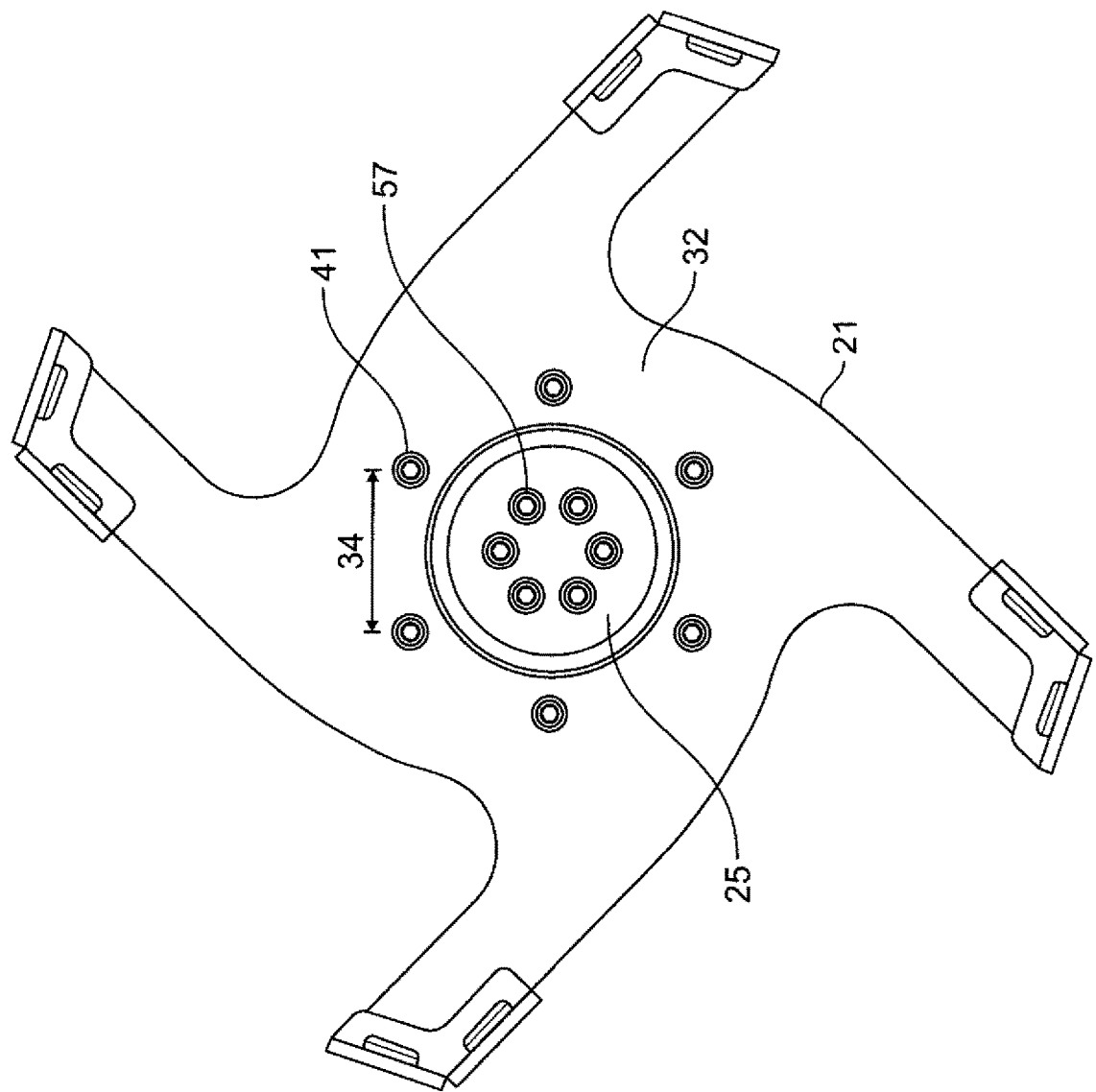
FIG. 9 shows a top view of the assembly of FIG. 3.

One embodiment of the inventive loading arm assembly is shown in FIGS. 3 and 7 and designated by the reference numeral 20. The assembly includes a loading arm 21, and spacer connector 23, and a cap assembly 25. FIG. 9 shows a top view of the assembly showing the cap assembly 25 and the loading arm 21.

The loading arm 21 is similar to the arm disclosed in U.S. Pat. No. 8,506,017 to Southern, which is herein incorporated by reference in its entirety. This loading arm has improved wear features at the ends of the arms. It should be understood that the inventive assembly could use other types of loading arms as well.

The spacer connector 23 has two functions. One is that the spacer connector is made with a thickness to provide a spacing function between the loading arm and a gear box or driving mechanism for the loading arm assembly that is part of the mining equipment using the loading arms. Although an actual gear box is not shown, it is represented by the structure designated by reference 26 in FIG. 3 and this structure represents any type of driving mechanism on the mining equipment to rotate the loading arms for mined coal movement.

The other function of the spacer connector is actually a dual function in that the spacer provides a mounting place for the loading arm such that the spacer connector and loading arm are connected together and the spacer connector is also attachable to the gear box.

Figure 4:
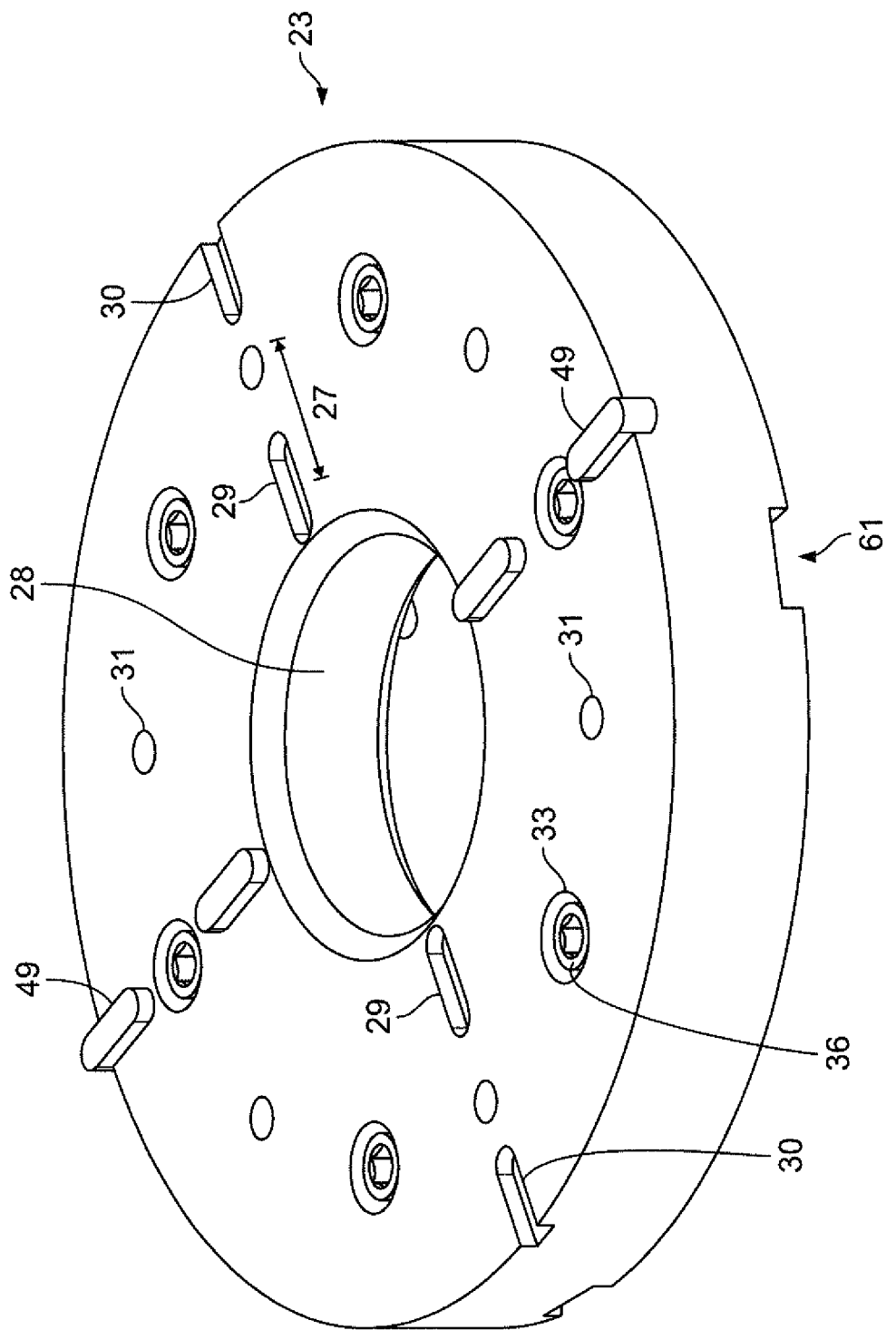
FIG. 4 is a perspective view of the spacer connector of the assembly of FIG. 3.

The spacer connector 23 is shown by itself in FIG. 4, is cylindrical in shape and includes a center opening 28, a top surface 27, and a number of key slots 29 and 30 in the top surface 27. The key slots 29 are positioned near an inner periphery of the spacer connector 23 and the key slots 30 are positioned near an outer periphery of the spacer connector 23.

The top surface also includes a first set of threaded openings 31, which are designed to receive a threaded bolt to connect the spacer connector to the loading arm as described below. A second set of openings 33 are included in the spacer connector 23. This second set of openings 33 are through openings that allow a bolt 36 to pass through the openings 33 and threadably attach to the gear box of the mining equipment.

Figure 8:
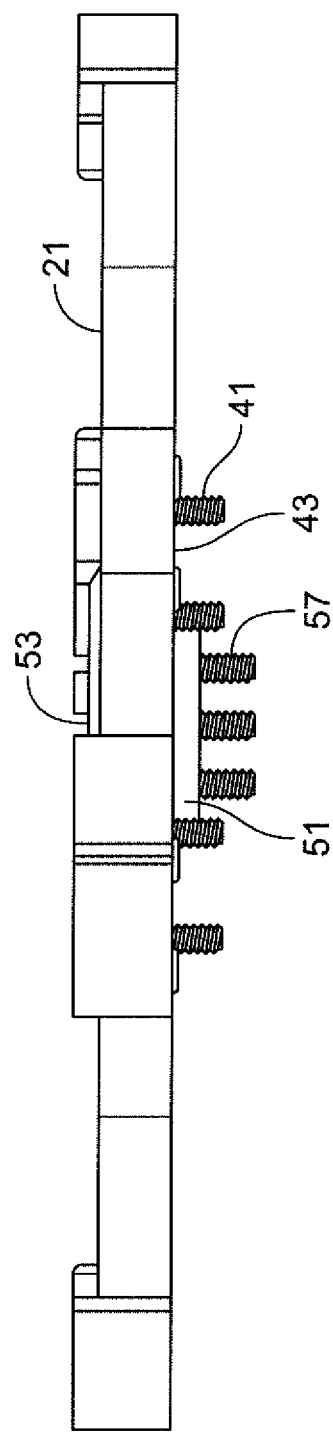
FIG. 8 shows a side view of the assembly of FIG. 3 without the spacer connector.

Referring back to FIG. 3, a center portion 32 of the loading arm 21 has a plurality of through openings 37. These through openings 37 are configured to allow the threaded part of a bolt to pass through the loading arm body 39 and threadably attach to the threaded openings 31 in the spacer connector 23. Referring to FIG. 8, the bolts used to removably attach the loading arm 21 to the spacer connector 23 are designated by the reference numeral 41 and are sized to extend below the body 39 of the loading arm 21 and thread into the threaded openings 31 in the spacer connector 23. In other words, the connection between the loading arm 21 and the spacer connector 23 is facilitated using the bolts 41, the openings 37 in the loading arm 21, and openings 31 in the spacer connector 23.

Figure 12:
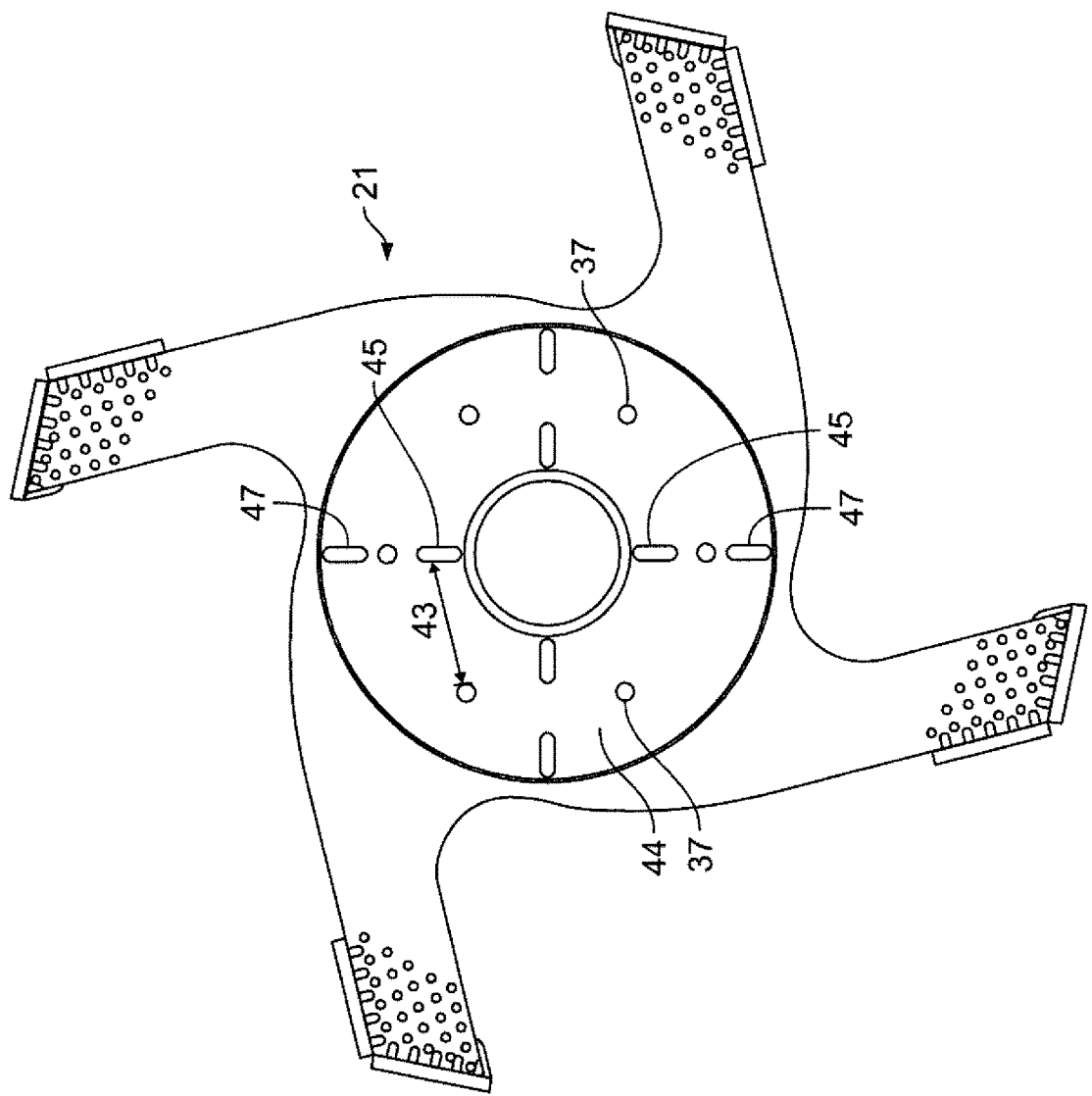
FIG. 12 shows an underside view of the loading arm of the assembly of FIG. 7.

Referring now to FIGS. 4, 8, and 12, the top surface 27 of the spacer connector is a machined surface to make the top surface flat. Likewise, the underside surface 43 of at least the center portion 44 of the loading arm 21, which is that that would be in contact with the surface 27 of the spacer connector 23 when the two are attached, is also a machined flat surface. Having the opposing surfaces machined to be flat improves the mating and attachment of the spacer connector 23 and loading arm 21. If so desired, a loctite or other adhesive could be used between the surfaces 27 and 43 to improve the attachment.

Figure 11:
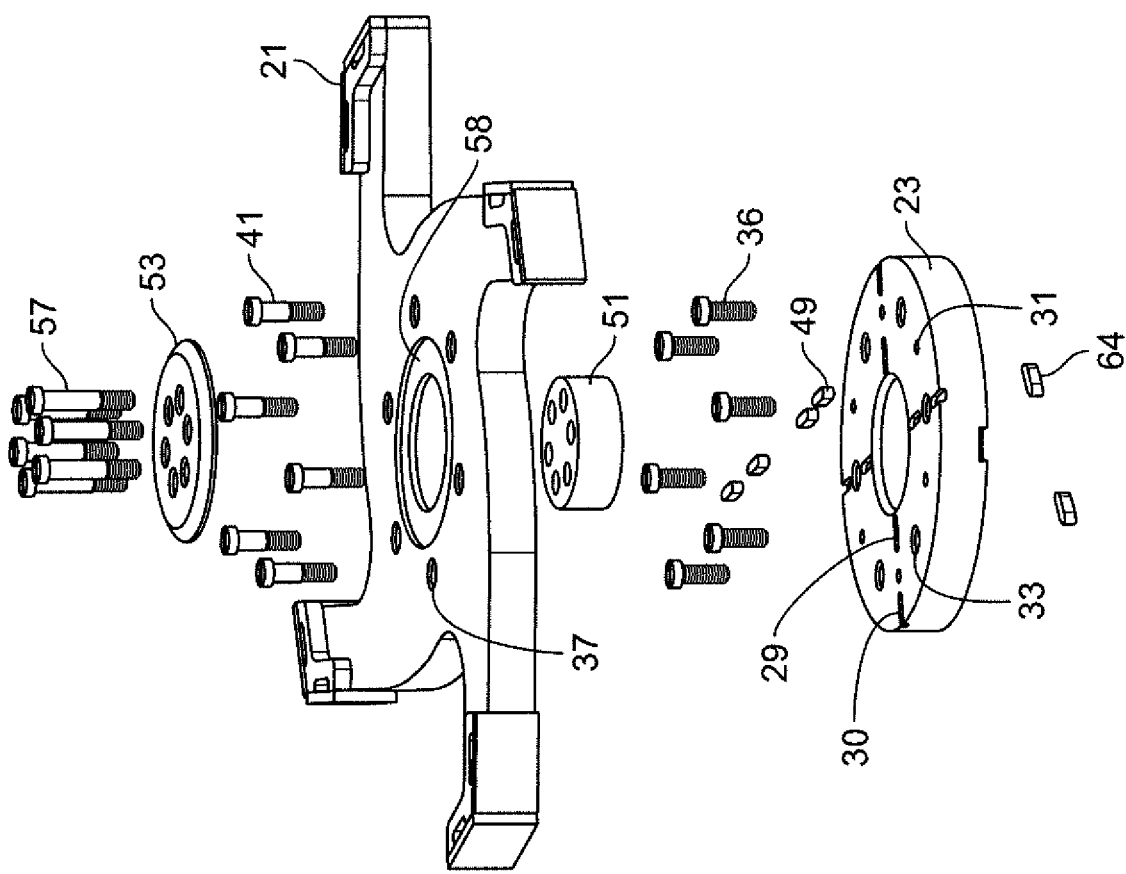
FIG. 11 shows an exploded view of the assembly of FIG. 7.

Referring now to FIGS. 4, 11, and 12, the loading arm 21 is also configured with keyway slots 45 and 47, that are positioned in the loading arm surface so as to be aligned with the slots 29 and 30 of the spacer connector. As part of the assembly of the spacer connector 23 and loading arm 21, machine keys 49, see the exploded view in FIG. 11, are used and inserted into the slots 29 and 30. The loading arm 21 is then positioned on the surface 27 of the spacer connector so that portions of the bars extending above the surface 27 of the spacer connector 23 engage the slots 45 and 47 in the surface 41 of the loading arm 21. The keyway slots and machine keys 49 assist in positioning the spacer connector 23 and facilitate the alignment of the threaded openings 31 in the spacer connector 23 with the through openings 37 in the loading arm and take the side loading and shear stress off of the mounting bolts.

Figure 5:
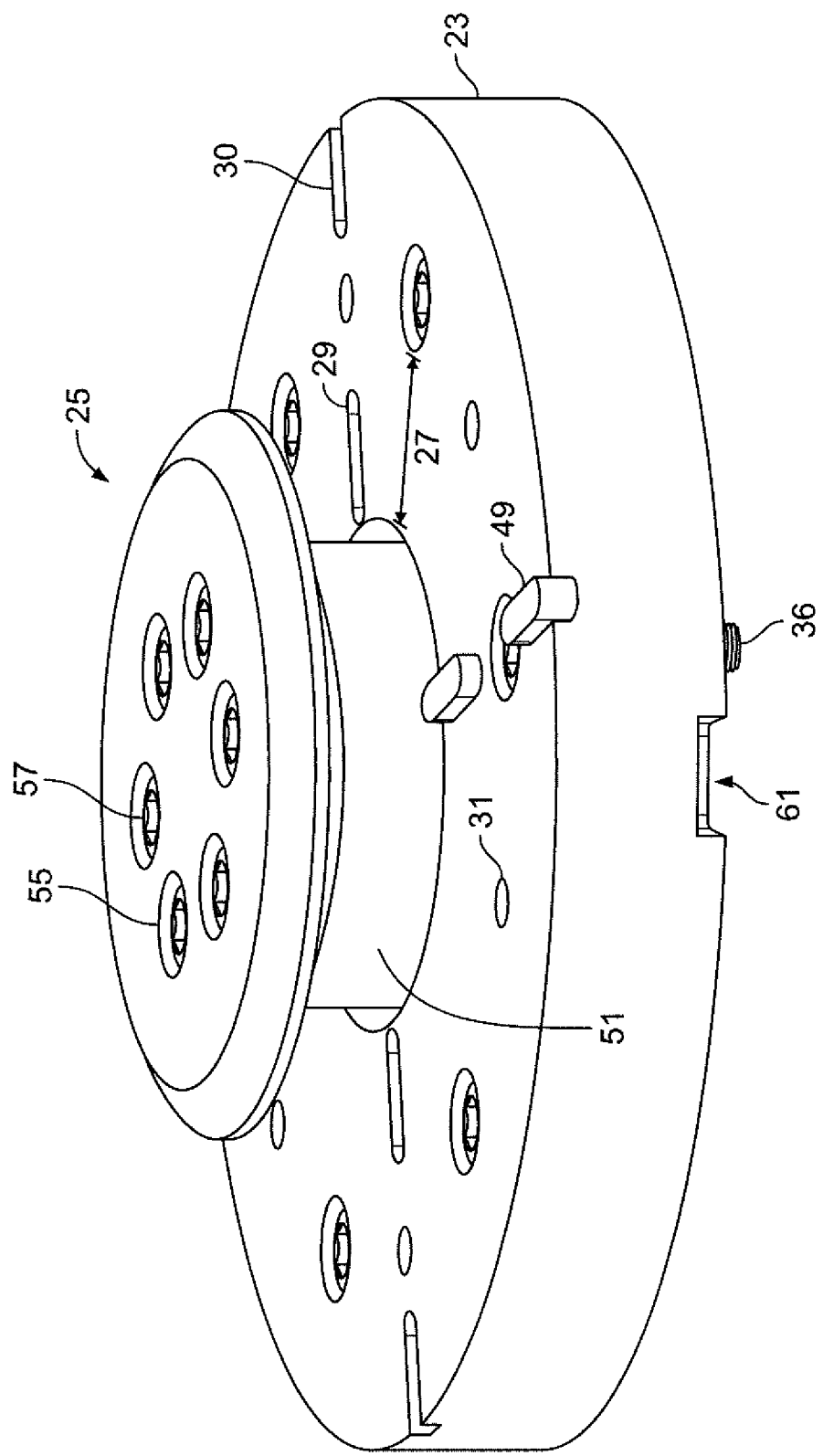
FIG. 5 shows a perspective view of the assembly of FIG. 3 without the loading arm.
Figure 6:
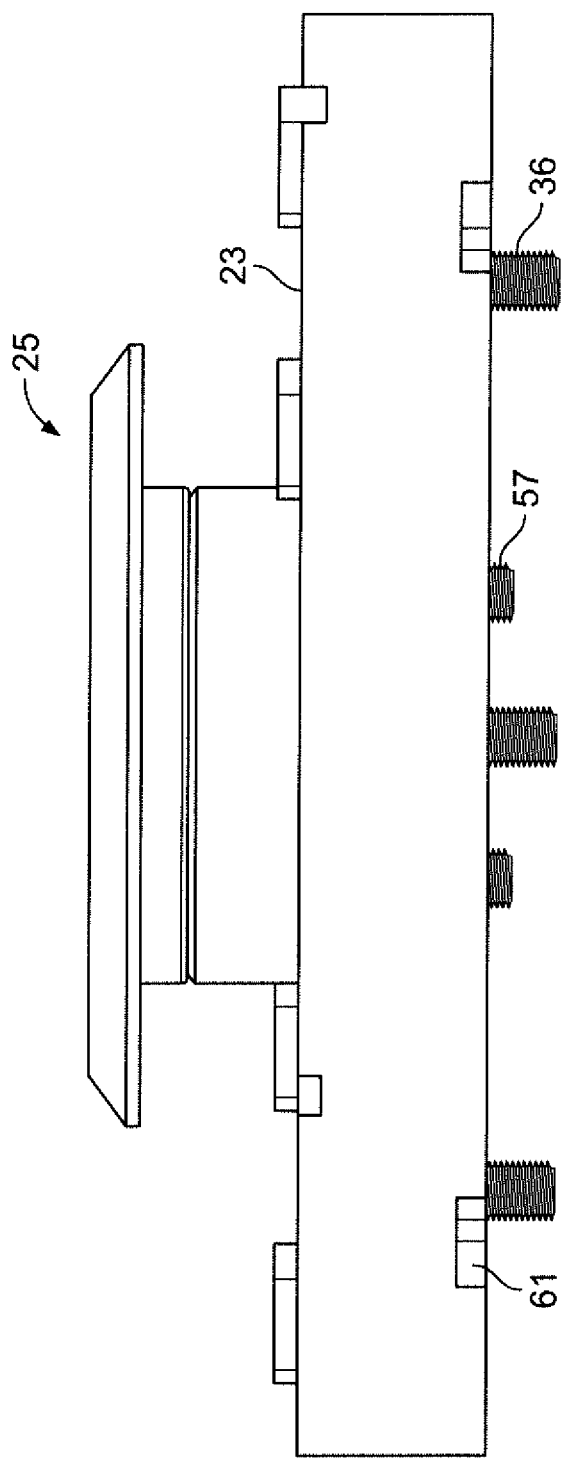
FIG. 6 shows a side view of FIG. 5, with the bolts used to attach the spacer connector to a gearbox.

Referring now to FIGS. 3, 5, and 8, the cap assembly 25 has a body portion 51 and a top flange 53. The cap assembly 25 also has a number of openings 55, that allow for a bolt connection of the cap assembly 25 to the gearbox. Bolts for this attachment are shown in FIG. 8 by reference numeral 57. It should be understood that the cap assembly 25 is an optional component of the assembly as it is not necessary for the attachment of the loading arm 21 via the spacer connector 23 to the gear box 24. The cap assembly 25 mainly assists in centering of the assembly, particularly during rotation thereof. If a cap assembly is not used, it is possible to configure both the spacer connector 23 and the loading arm 21 without their respective center openings. Also, the cap assembly 25 could be made as a one-piece component so that the top flange 52 and body portion 51 are integral, not separable as illustrated. A cap by itself is a common feature of prior art loading arm assemblies. The central hub component or body portion 51 below the cap is in the airspace between the cap and the gearbox. The original gearbox riser centers the spacer on the gearbox. The hub or body portion 51 continues to align the spacer to the loading arm keeping the entire assembly centered during rotation.

Typically, the gear box will have a riser that is sized to enter a portion of the opening 28 in the spacer connector. As a result of this configuration, the bolts 57 for the cap assembly 23, which extend below the loading arm 21 as shown in FIG. 8 will be sized to fit the height of the gear box riser and the depth of the associated holes in the gear box riser. The design of the gearbox is not fixed and adaptions can be made to fit the gearbox model as required.

Because the loading arm 21 is removably attachable to the spacer connector 23 and the spacer connector 23 is removably attachable to the gear box, shorter bolts can be used for both attachments. Typically, the bolt length is up to about 8 inches when a loading arm is attached to a gear box with a conventional spacer positioned between the two. This length is necessary as the prior art spacers are usually in the range of 70 to 80 mm. The inventive assembly allows much shorter bolt lengths, e.g., 3.5 inches, and the problem of stretching of the long bolts is avoided. The fasteners connecting the spacer to the gearbox are captured by the offset nature of the bolt holes. The loading arm covers the first set of mounting holes in the spacer connector once the two are attached. This prevents the lower mounting fasteners from coming completely out of the gearbox.

Figure 10:
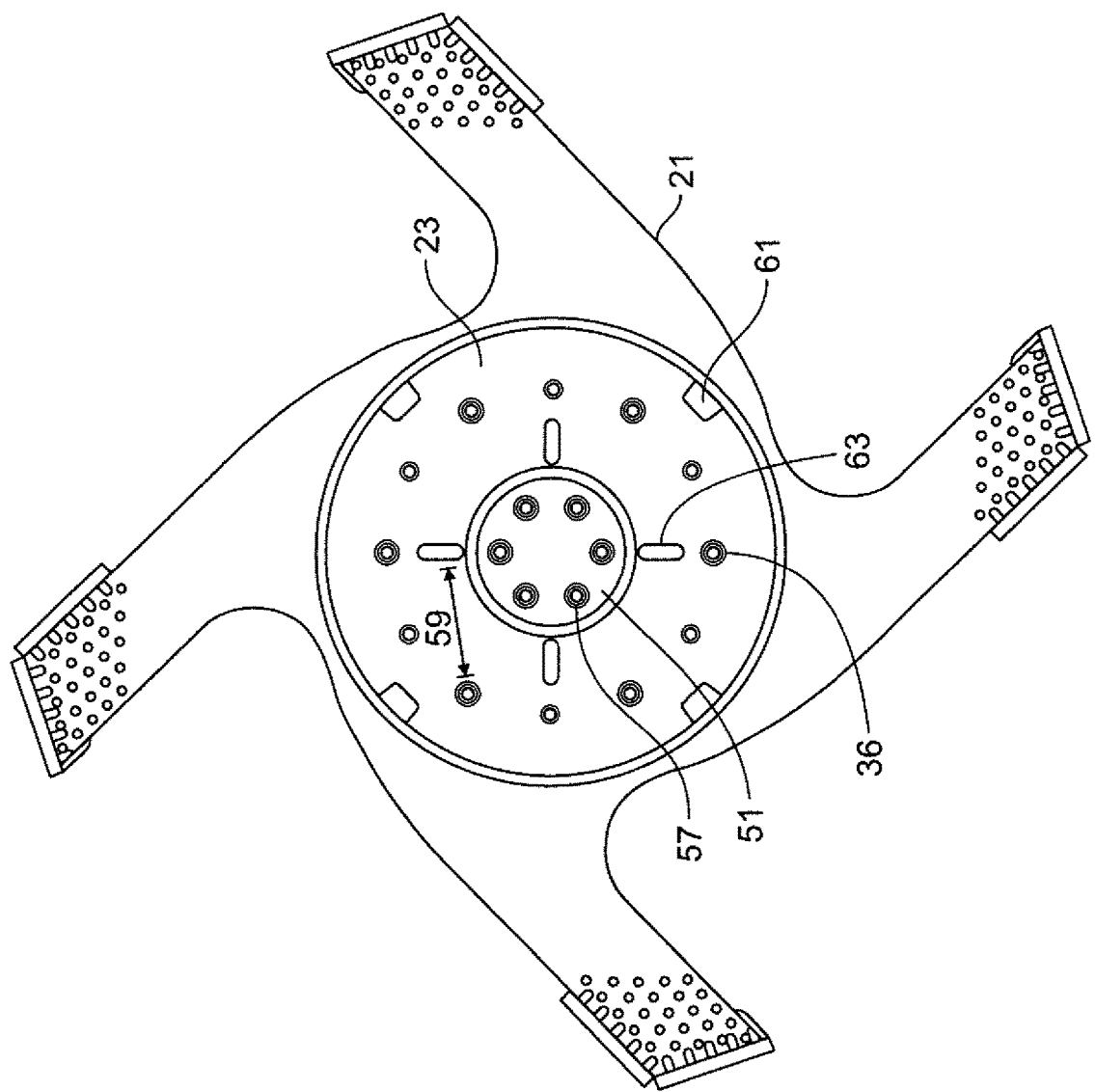
FIG. 10 shows a bottom view of the assembly of FIG. 7.

Referring to FIG. 10, the bottom side of the assembly 20 is shown, wherein a bottom surface of the spacer connector 23 is designated by reference numeral 59. This surface 59 can have slots 61 positioned along the outer periphery of the spacer connector 23, see also FIG. 4. When the spacer connector 23 is positioned on the gear box 24, see FIG. 3, the slots 61 provide an opening to use a pry bar or other tool to more easily separate the spacer connector 23 from the gear box if these components need to be separated.

The bottom surface 59 of the spacer connector can also have keyway slots 63 and metal machine keys 64, see FIG. 11, to facilitate alignment of the spacer connector 23 with the gear box or driving mechanism.

FIG. 11 shows an exploded view of the assembly. The machine keys 64 are shown that engage the keyway slots 63 on the underside surface 59 of the spacer connector 23. The bolts 36 are shown that pass through the openings 33 in the spacer connector 23 for threaded attachment to the gear box. The metal machine keys 49 are illustrated for engagement with the keyway slots 29 and 30 in the spacer connector and corresponding keyway slots (not shown) on the underside of the loading arm 21. The bolts 41 are shown that extend through the openings 37 in the loading arm and threadably attach to the threaded openings 31 in the spacer connector 23. The cap assembly 25 is shown with the bolts 57 extending through openings 55 in the cap flange 53 and openings in the cap body 51 for threaded attachment to the gear box.

When the cap assembly 25 is used, the loading arm 21 top surface 34, see FIG. 9, can have a recess 58, that is sized to receive the cap flange 53 so that a top surface of the loading arm 21 has a lower profile.

FIG. 12 shows an underside surface 69 of the loading arm 21. An underside surface is designated by reference numeral 71 and, as noted above, is a machined flat surface to mate with the machined flat surface of the spacer connector 23.

The underside surface 69 also has keyway slots 73 and 75, with slots 73 along an inner portion of the center portion of the loading arm and slots 75 positioned along the outer periphery of the center portion of the loading arm. As described above, the metal machine keys 49 engage both the keyway slots in the top surface 27 of the spacer connector 23 and the keyway slots in the underside surface 69 of the loading arm 21 for alignment of these two components.

In use, a pair of inventive loading arm assemblies would be secured to a driving mechanism of a mining machine and rotated by a driving mechanism to direct mined coal that is dropped into the pan below the loading arms to the conveyor of the mining machine for removal from the mining site.

While it is typical for a mining machine to use a pair of loading arms, the inventive loading arm assembly could be used singularly if the mining equipment dictated such use.

As such, an invention has been disclosed in terms of preferred embodiments thereof which fulfills each and every one of the objects of the present invention as set forth above and provides a new and improved loading arm assembly design for mining equipment and its method of use.

Of course, various changes, modifications and alterations from the teachings of the present invention may be contemplated by those skilled in the art without departing from the intended spirit and scope thereof. It is intended that the present invention only be limited by the terms of the appended claims.

I claim:

1. A loading arm assembly for a mining machine comprising:
   a loading arm having a center portion and plurality of arms extending from the center portion for directing mined material to a conveyor of a mining machine, the center portion including an optional opening and an underside surface, and
   a spacer connector having a top surface facing the underside surface of the center portion of the loading arm,
   the center portion of the loading arm having a first set of openings and the spacer connector having a second set of openings, the first set of openings aligned with the second set of openings and permitting the center portion of the loading arm to be removably attachable to the spacer connector,
   the spacer connector having a third set of openings, the third set of openings permitting the spacer connector to be removably attachable to a loading arm drive mechanism of the mining machine.

2. The loading arm assembly of claim 1, wherein the center portion of the loading arm includes a center through opening.

3. The loading arm assembly of claim 1, wherein the first set of openings are in the center portion of the loading arm and the second set of openings in the spacer connector are threaded to permit the center portion of the loading arm to be removably attachable to the spacer connector using a threaded connection.

4. The loading arm assembly of claim 1, wherein the third set of openings in the spacer connector allow for bolts to pass therethrough and threadably connect to the loading arm driving mechanism of the mining machine.

5. The loading arm assembly of claim 1, wherein the third set of openings in the spacer connector allow for bolts to pass therethrough and threadably connect to the loading arm driving mechanism of the mining machine.

6. The loading arm assembly of claim 1, wherein the spacer connector has a first set of keyway slots spaced apart along an inner part of the spacer connector and a second set of keyway slots spaced apart along an outer part of the spacer connector, the first and second sets of keyway slots facilitating alignment with correspondingly aligned keyway slots in the underside surface of the loading arm.

7. The loading arm assembly of claim 2, further comprising a cap assembly, the cap assembly configured to pass through the center through opening in the loading arm and a center through opening spacer connector and be removably attachable to a driving mechanism of the mining machine.

8. The loading arm assembly of claim 1, wherein at least a center portion of a top surface of the spacer connector and at least a center portion of a bottom surface of the loading arm have machined flat surfaces.

9. A mining machine having at least a conveyor assembly for removing the mined material, and at least one loading arm assembly for directing the removed material to a conveyor of the conveyor assembly, each loading arm assembly, the at least one loading arm assembly comprising the loading arm assembly of claim 1.

10. In a method of mining a material using a mining machine having a conveyor assembly for removing the mined material and loading arm assemblies for directing the removed material to a conveyor of the conveyor assembly, the improvement comprising using the loading arm assembly of claim 1 for directing the mined material to the conveyor.

* * * * *